US012810462B2

(12) United States Patent
Faure et al.

(10) Patent No.: US 12,810,462 B2
(45) Date of Patent: Nov. 24, 2026

(54) METHOD AND SYSTEM FOR DETECTING AT LEAST ONE GROUND MARKING ELEMENT OF AT LEAST ONE LANDING RUNWAY BY COMPUTER VISION AND THROUGH SIGNAL PROCESSING TECHNIQUES

(71) Applicant: AIRBUS OPERATIONS (S.A.S.), Toulouse (FR)

(72) Inventors: Louise Faure, Toulouse (FR); Thierry Sammour Sawaya, Toulouse (FR)

(73) Assignee: AIRBUS OPERATIONS (S.A.S.), Toulouse (FR)

(*) Notice: Subject to any disclaimer, the term of this patent is extended or adjusted under 35 U.S.C. 154(b) by 323 days.

(21) Appl. No.: 18/753,941

(22) Filed: Jun. 25, 2024

(65) Prior Publication Data

US 2025/0005783 A1 Jan. 2, 2025

(30) Foreign Application Priority Data

Jun. 27, 2023 (FR) ....................................... 2306719

(51) Int. Cl.
*G06T 7/70* (2017.01)
*G06T 7/10* (2017.01)
(Continued)

(52) U.S. Cl.
CPC .................. *G06T 7/70* (2017.01); *G06T 7/10* (2017.01); *G06V 10/26* (2022.01); *G06V 10/751* (2022.01); *G06V 10/82* (2022.01); *G06V 20/17* (2022.01); *G06V 20/56* (2022.01); *G08G 5/54* (2025.01); *G06T 2207/10032* (2013.01); *G06T 2207/20084* (2013.01); *G06T 2207/20112* (2013.01);
(Continued)

(58) Field of Classification Search
None
See application file for complete search history.

(56) References Cited

U.S. PATENT DOCUMENTS 11,783,575 B2 * 10/2023 Billhartz ................ B64D 45/04
2021/0224556 A1 * 7/2021 Xu ......................... G06V 10/44

FOREIGN PATENT DOCUMENTS

CN 102750703 A * 10/2012
CN 108369727 A * 8/2018 ............... G08G 5/55
(Continued)

OTHER PUBLICATIONS

French Search Report for FR 2306719, dated Jan. 10, 2024, 2 pages.
(Continued)

*Primary Examiner* — Jiangeng Sun
(74) *Attorney, Agent, or Firm* — Nixon & Vanderhye P.C.

(57) ABSTRACT

A method and system for detecting a ground marking element of a landing runway by computer vision and through signal processing techniques. A detection system (S) including an image collection unit (10), a cutting unit (11) for cutting the image (I) into strips (ST1), a determination unit (12) to determine at least one mean intensity curve (C) for at least one strip (ST1), a recognition unit (13) for recognizing in the mean intensity curve (C) at least one ground marking element (100) of the landing runway (T), a detection unit (2) for detecting a position of at least one ground marking element of the landing runway (T) in the images (I).

16 Claims, 6 Drawing Sheets

(51) Int. Cl.

| | |
|---|---|
| ***G06V 10/26*** | (2022.01) |
| ***G06V 10/75*** | (2022.01) |
| ***G06V 10/82*** | (2022.01) |
| ***G06V 20/17*** | (2022.01) |
| ***G06V 20/56*** | (2022.01) |
| ***G08G 5/54*** | (2025.01) |

(52) U.S. Cl.

CPC ............... *G06T 2207/30184* (2013.01); *G06T 2207/30204* (2013.01); *G06T 2207/30252* (2013.01)

(56) References Cited

FOREIGN PATENT DOCUMENTS

| | | | | | |
|---|---|---|---|---|---|
| CN | 112085021 | A | * | 12/2020 | ........... G06V 30/153 |
| CN | 113506214 | A | * | 10/2021 | ........... G06F 18/214 |
| CN | 115914815 | A | * | 4/2023 | |
| EP | 3319311 | A1 | * | 4/2023 | ............. H04N 25/77 |
| JP | 2011517351 | A | * | 6/2011 | ........... G06V 20/582 |
| RU | 169326 | U1 | * | 3/2017 | |

OTHER PUBLICATIONS

Stephan Wolkow et al., “Model-based Threshold and Centerline Detection for Aircraft Positioning during Landing Approach”, PNT 2019—Proceedings of the ION 2019 Pacific PNT Meeting, The Institute of Navigation, Apr. 11, 2019, pp. 767-776.

Philip T.G. Jackson et al., “Runway Detection in High Resolution Remote Sensing Data”, 9th International Symposium on Image and Signal Processing and Analysis (ISPA), IEEE, , Sep. 7, 2015, pp. 170-175.

Sebastian Sichelschmidt et al., “Pedestrian Crossing Detecting as a part of an Urban Pedestrian Safety System”, Intelligent Vehicles Symposium (IV), IEEE, Jun. 21, 2010, pp. 840-844.

* cited by examiner

METHOD AND SYSTEM FOR DETECTING AT LEAST ONE GROUND MARKING ELEMENT OF AT LEAST ONE LANDING RUNWAY BY COMPUTER VISION AND THROUGH SIGNAL PROCESSING TECHNIQUES

RELATED APPLICATION

This application incorporates by reference and claims priority to French patent application 2306719, filed Jun. 27, 2023.

TECHNICAL FIELD

The present invention relates to a method and a system for detecting a landing runway using computer vision and by means of signal processing techniques.

BACKGROUND

The function of automatically landing an aircraft on a landing runway imposes severe constraints in terms of the implementation of the navigation systems of the aircraft. This function can require the provision of new technologies for extending the automatic landing possibilities to all airports at any time.

Vision technologies can provide worthwhile advantages because these technologies are not dependent on ground infrastructures, such as an instrument landing system.

In order for an aircraft to land, its trajectory must be consistent with its current position in relation to the landing runway, both with its lateral position and with its vertical position.

The threshold of the landing runway can be one of the main landmarks that can be used to obtain information concerning the vertical position of the aircraft in relation to the landing runway. Indeed, the threshold is marked on the landing runway using ground markings made up of several white and black strips with fixed widths and spacings between them. In addition, these strips are generally placed 6 meters before the threshold. This set of strips forming a ground marking element is often called "piano". A "ground marking element" is understood to mean a pattern plotted on the ground of the landing runway T and/or a light pattern of an approach lighting system for the landing runway T.

Computer vision technology could be used for detecting the ground markings, such as the piano, in order to determine the position of the aircraft.

However, this technology can be difficult to implement in real time due to the large amount of data to be processed. For example, an 8-bit coded high-definition color image represents approximately 2.8 MB to be processed. Significant computing resources are therefore required.

SUMMARY OF INVENTION

An aim of the present invention is to propose a method and a system for detecting a landing runway by computer vision that requires limited computing resources. To this end, it relates to a method for detecting at least one ground marking element of at least one landing runway.

According to the invention, the detection method may comprise at least the following steps:

an image collection step, implemented by an image collection unit, for collecting at least one image captured by at least one image capture unit, the one or more images being in the form of a matrix of pixels having a first dimension and a second dimension;

a first set of steps comprising:

(a) a first cutting step, implemented by a first cutting unit, for cutting the matrix of pixels into first parallel strips each associated with a respective position of each first strip in the matrix of pixels of the one or more images, each first strip corresponding to a first sub-matrix having at least one row of pixels and a number of columns of pixels equal to the first dimension of the matrix of pixels;

(b) a first determination step, implemented by a first determination unit, for determining a mean intensity curve for at least one first strip selected from the first strips originating from cutting the matrix of pixels, the mean intensity curve being determined by computing, for each column of pixels of the first sub-matrix of the one or more first selected strips, a mean intensity of the one or more pixels of each column of pixels;

(c) a first recognition step, implemented by a first recognition unit, for recognizing, in the mean intensity curve of the one or more first selected strips, a curve shape characteristic of at least one ground marking element of at least one landing runway;

the detection method further comprising:

a detection step, implemented by a detection unit, for detecting a position of the one or more ground marking elements of at least one landing runway in the one or more images based on the one or more recognized ground marking elements and on the position of the one or more first selected strips in the matrix of pixels of the one or more images.

Thus, by virtue of determining mean intensity curves that are determined based on strips of images, it is possible to detect ground marking elements in a two-dimensional image based on one-dimensional curves. The computing resource requirements are thus significantly reduced compared to detection using conventional shape recognition technologies on a two-dimensional image.

According to an embodiment, the detection method comprises a second set of steps preceding the detection step, the second set of steps comprising:

a second cutting step, implemented by a second cutting unit, for cutting the matrix of pixels into second parallel strips each associated with a respective position of each second strip in the matrix of pixels of the one or more images, each second strip corresponding to a second sub-matrix having at least one row of pixels and a number of columns of pixels equal to the second dimension of the matrix of pixels;

a second determination step, implemented by a second determination unit, for determining a mean intensity curve for at least one second strip selected from the second strips originating from cutting the matrix of pixels, the mean intensity curve being determined by computing, for each column of pixels of the second sub-matrix of the one or more second selected strips, a mean intensity of the one or more pixels of each column of pixels;

a second recognition step, implemented by a second recognition unit, for recognizing, in the mean intensity curve of the one or more second selected strips, a curve shape characteristic of at least one ground marking element of at least one landing runway;

the detection step being implemented for detecting a position of the one or more ground marking elements of at least one landing runway in the one or more images based on the one or more recognized ground marking elements, on the position of the one or more first selected strips in the matrix of pixels of the one or more images and on the position of the one or more second selected strips in the matrix of pixels of the one or more images.

According to a first alternative embodiment, the first recognition step and/or the second recognition step are implemented in order to recognize a curve shape characteristic of at least one ground marking element of the one or more landing runways in the mean intensity curve of the one or more first selected strips and/or of the one or more second selected strips using a neural network.

According to a second alternative embodiment, the first recognition step comprises the following sub-steps:

a first frequency analysis sub-step, implemented by a first frequency analysis sub-unit, for detecting at least one harmonic in the mean intensity curve of the one or more first selected strips;

a first data partitioning sub-step, implemented by a first data partitioning sub-unit, for forming at least one group comprising one or more harmonics characteristic of a ground marking element of the landing runway, with the one or more harmonics characteristic of a ground marking element being stored in a database;

a first recognition sub-step, implemented by a first recognition sub-unit, for recognizing at least one ground marking element of the one or more landing runways for the one or more groups formed in the first data partitioning sub-step.

According to an embodiment for the second alternative embodiment, the second recognition sub-step comprises the following sub-steps:

a second frequency analysis sub-step, implemented by a second frequency analysis sub-unit, for detecting at least one harmonic in the mean intensity curve of the one or more second selected strips;

a second data partitioning sub-step, implemented by a second data partitioning sub-unit, for forming at least one group comprising one or more harmonics characteristic of a ground marking element of the landing runway, with the one or more harmonics characteristic of a ground marking element being stored in a database;

a second recognition sub-step, implemented by a second recognition sub-unit, for recognizing at least one ground marking element of the one or more landing runways for the one or more groups formed in the second data partitioning sub-step.

According to a third alternative embodiment, the first recognition step comprises the following sub-steps:

a first correlation sub-step, implemented by a first correlation sub-unit, for determining at least one correlation parameter between the mean intensity curve of the one or more first selected strips with at least one synthetic curve characteristic of a ground marking element, with the one or more synthetic curves being stored in a database;

a first recognition sub-step, implemented by a first recognition sub-unit, for recognizing at least one ground marking element of the one or more landing runways if the correlation parameter determined in the first correlation sub-step is greater than or equal to a predetermined value.

According to an embodiment for the third alternative embodiment, the second recognition step comprises the following sub-steps:

a second correlation sub-step, implemented by a second correlation sub-unit, for determining at least one correlation parameter between the mean intensity curve of the one or more second selected strips with at least one synthetic curve characteristic of a ground marking element, with the one or more synthetic curves being stored in a database;

a second recognition sub-step, implemented by a second recognition sub-unit, for recognizing at least one ground marking element of the one or more landing runways if the correlation parameter determined in the second correlation sub-step is greater than or equal to a predetermined value.

In addition, the first set of steps comprises:

a first comparison step, implemented by a first comparison unit, for comparing the mean intensity curves for which the same ground marking element has been recognized in order to determine whether or not there is a shift between said mean intensity curves;

a first rectification step, implemented by a first rectification unit if a shift has been determined, for rectifying the matrix of pixels of the one or more images as a function of the determined shift;

the first set of steps being repeated with the matrix of pixels of the one or more images rectified in the first rectification step.

According to an embodiment, the second set of steps comprises:

a second comparison step, implemented by a second comparison unit, for comparing the mean intensity curves for which the same ground marking element has been recognized in order to determine whether or not there is a shift between said mean intensity curves;

a second rectification step, implemented by a second rectification unit if a shift has been determined, for rectifying the matrix of pixels of the one or more images as a function of the determined shift;

the second set of steps being repeated with the matrix of pixels of the one or more images rectified in the second rectification step.

In addition, the detection method comprises a third determination step, implemented by a third determination unit, for determining a position of at least one threshold of the one or more landing runways based on the position of the one or more ground marking elements detected in the one or more images and on characteristics of the one or more landing runways originating from a runway database.

In addition, the detection method comprises a fourth determination step, implemented by a fourth determination unit, for determining a position of the aircraft based on the position of the one or more thresholds of the one or more landing runways in the image, on a position and angles of the one or more image collection units and on characteristics of the one or more landing runways originating from the runway database.

In addition, the detection method comprises a transmission step, implemented by a transmission unit, for sending a user device a signal representing the position of at least one threshold of the one or more landing runways or the position of the aircraft, or the position of the one or more ground marking elements of at least one landing runway in the one or more images The invention may also be embodied in a system for detecting at least one ground marking element of at least one landing runway. The detection system may comprises:

an image collection unit configured for collecting at least one image captured by at least one image capture unit, the one or more images being in the form of a matrix of pixels having a first dimension and a second dimension;

a first set of units comprising:

(a) a first cutting unit configured for cutting the matrix of pixels into first parallel strips each associated with a respective position of each first strip in the matrix of pixels of the one or more images, each first strip corresponding to a first sub-matrix having at least one row of pixels and a number of columns of pixels equal to the first dimension of the matrix of pixels;

(b) a first determination unit configured for determining a mean intensity curve for at least one first strip selected from the first strips originating from cutting the matrix of pixels, the mean intensity curve being determined by computing, for each column of pixels of the first sub-matrix of the one or more first selected strips, a mean intensity of the pixel or pixels of each column of pixels;

(c) a first recognition unit configured for recognizing, in the mean intensity curve of the one or more first selected strips, a curve shape characteristic of at least one ground marking element of at least one landing runway;

the detection system further comprising:

a detection unit configured for detecting a position of the one or more ground marking elements of at least the landing runway in the one or more images based on the one or more recognized ground marking elements and on the position of the one or more first selected strips in the matrix of pixels of the one or more images.

According to an embodiment, the detection system comprises a second set of units comprising:

a second cutting unit configured for cutting the matrix of pixels into second parallel strips each associated with a respective position of each second strip in the matrix of pixels of the one or more images, each second strip corresponding to a second sub-matrix having at least one row of pixels and a number of columns of pixels equal to the second dimension of the matrix of pixels;

a second determination unit configured for determining a mean intensity curve for at least one second strip selected from the second strips originating from cutting the matrix of pixels, the mean intensity curve being determined by computing, for each column of pixels of the second sub-matrix of the one or more second selected strips, a mean intensity of the one or more pixels of each column of pixels;

a second recognition unit configured for recognizing, in the mean intensity curve of the one or more second selected strips, a curve shape characteristic of at least one ground marking element of at least one landing runway;

the detection unit being configured for detecting a position of the one or more ground marking elements of at least one landing runway in the one or more images based on the one or more recognized ground marking elements, on the position of the one or more first selected strips in the matrix of pixels of the one or more images and on the position of the one or more second selected strips in the matrix of pixels of the one or more images.

The invention may relates to an aircraft, comprising a detection system as specified above.

SUMMARY OF DRAWINGS

The attached figures will explain how the invention can be implemented. In these figures, identical reference signs designate similar elements.

DETAILED DESCRIPTION

Figure 1:
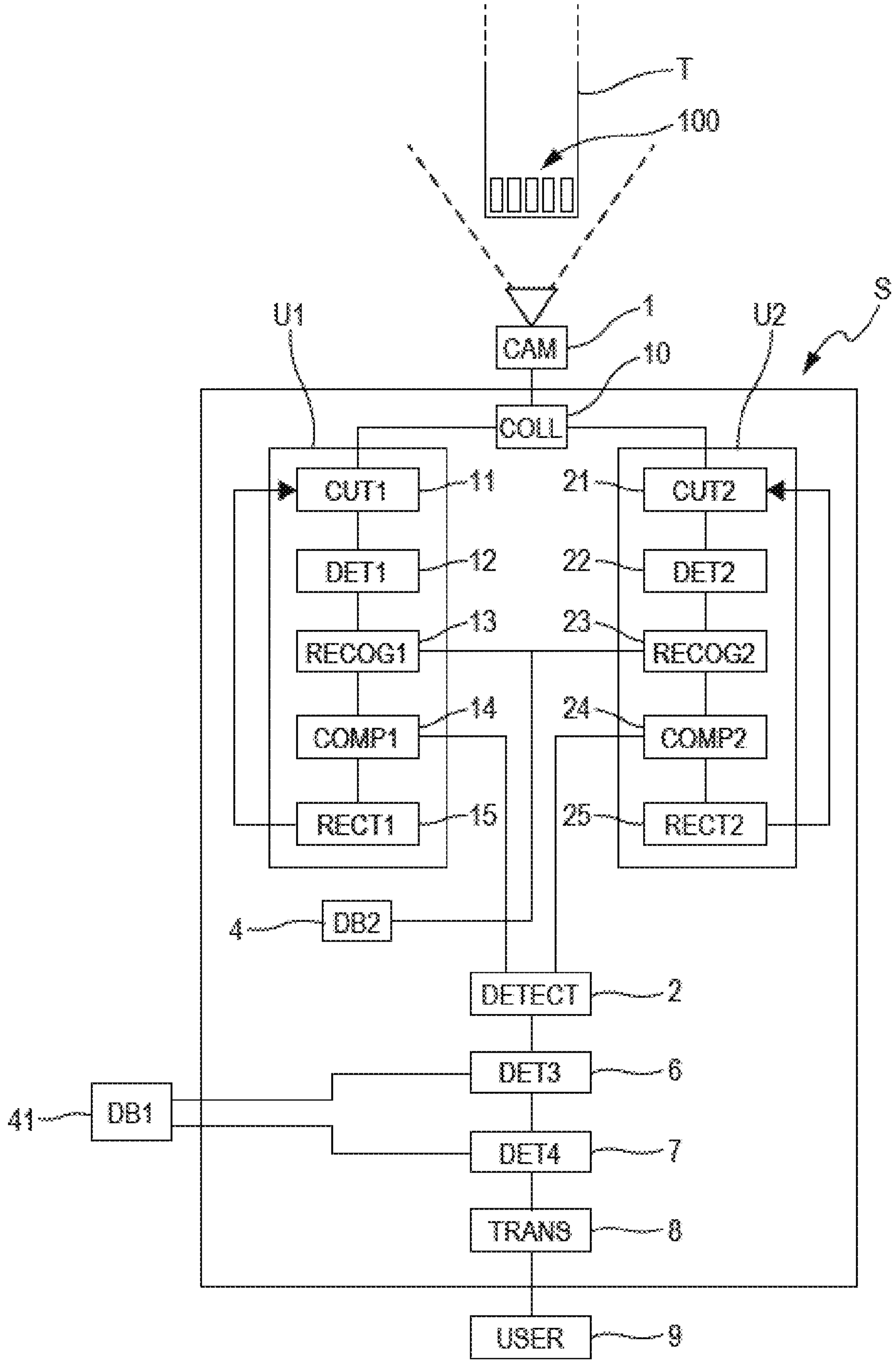
FIG. 1 schematically shows the detection system according to one embodiment.

The detection system S is schematically shown in FIG. 1. It is a system for detecting at least one ground marking element 100 of at least one landing runway T. The detection system S is designed to be placed on board an aircraft AC, in particular a transport aircraft.

A "ground marking element" is understood to mean a pattern plotted on the ground of the landing runway T and/or a light pattern of an approach lighting device of the landing runway T. The figures illustrate an example of a ground marking element 100 corresponding to a piano. However, the detection system S can be used for any other ground marking elements 100.

Figure 13:
FIG. 13 shows a profile view of an aircraft liable to land on a landing runway.

The detection system S can be implemented with a view to landing an aircraft AC on a landing runway T (FIG. 13). The detection system S also can be used when the aircraft AC is on the ground during a taxiing procedure. Thus, the detection system S can also detect ground marking elements 100 of an airport taxiway.

The detection system S comprises at least one image collection unit 10 (COLL), a first set of units U1 and a detection unit 2 (DETECT).

The image collection unit 10 is configured for collecting at least one image I captured by at least one image capture unit 1. The one or more images I is/are all in the form of a matrix M of pixels having a first dimension D1 and a second dimension D2.

The one or more image capture units 1 can each correspond to a camera on board the aircraft AC.

In a first embodiment, the first dimension D1 can correspond to a number of columns C1, C2, . . . , C10 of pixels of the matrix M of pixels and the second dimension D2 can correspond to a number of rows L1, L2, L3, L4, L5, L6 of the matrix M of pixels. In the example shown in FIG. 10, the matrix M of pixels has a first dimension D1 equal to 10 columns of pixels and a second dimension equal to 6 rows of pixels.

In a second embodiment (not shown), the first dimension D1 can correspond to a number of rows of pixels of the matrix M of pixels and the second dimension D2 can correspond to a number of columns of the matrix M of pixels.

The first set of units U1 comprises a first cutting unit 11 (CUT), a first determining unit 12 (DET) and a first recognition unit 13 (RECOG).

The first cutting unit 11 is configured to cut the matrix M of pixels into first parallel strips ST1. Each of the first strips ST1 is associated with its respective position in the matrix M of pixels of the one or more images I. Each first strip ST1 corresponds to a first sub-matrix SM1 having at least one row L1, L2, L3, L4, L5, L6 of pixels and a number of columns C1, C2, . . . , C10 of pixels equal to the first dimension D1 of the matrix M of pixels.

Figure 8:
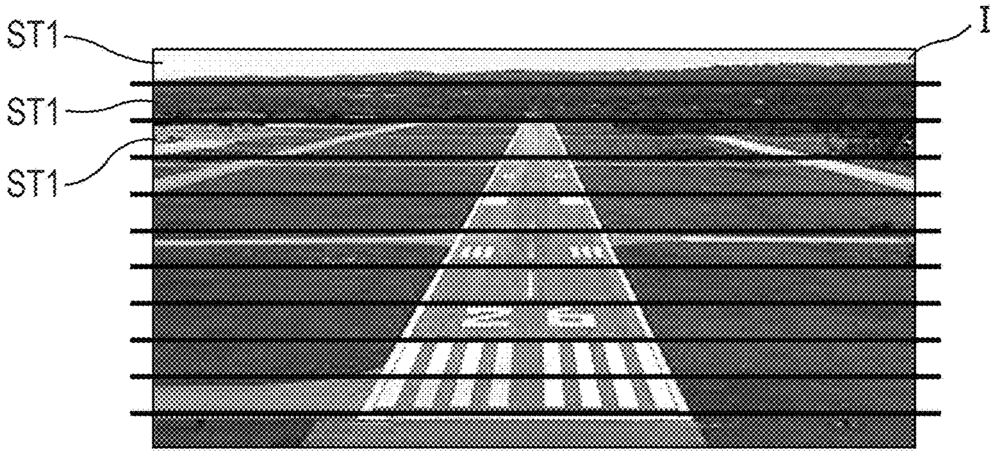
FIG. 8 shows the image cut into strips according to a first dimension of the image.
Figure 9:
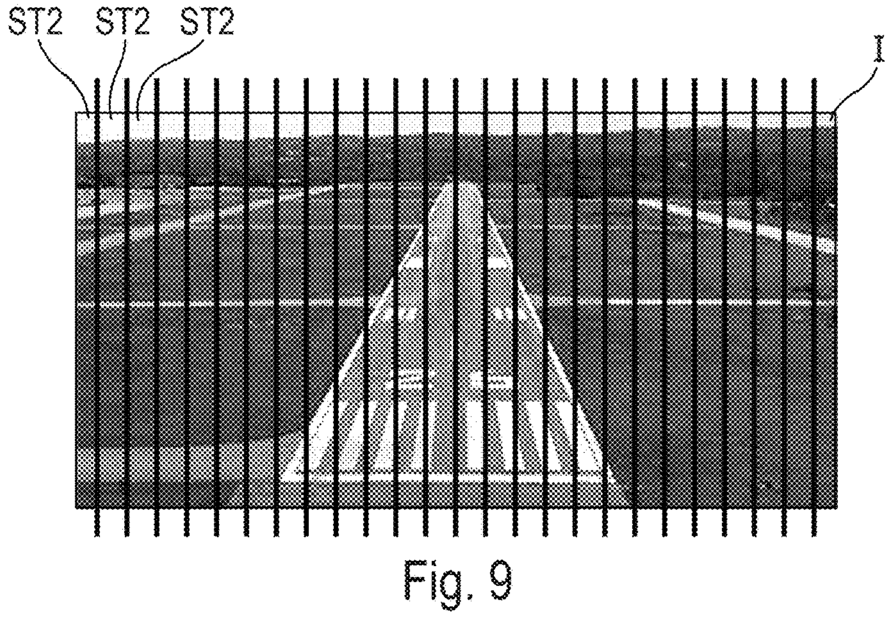
FIG. 9 shows the image cut into strips according to a second dimension of the image.
Figure 10:
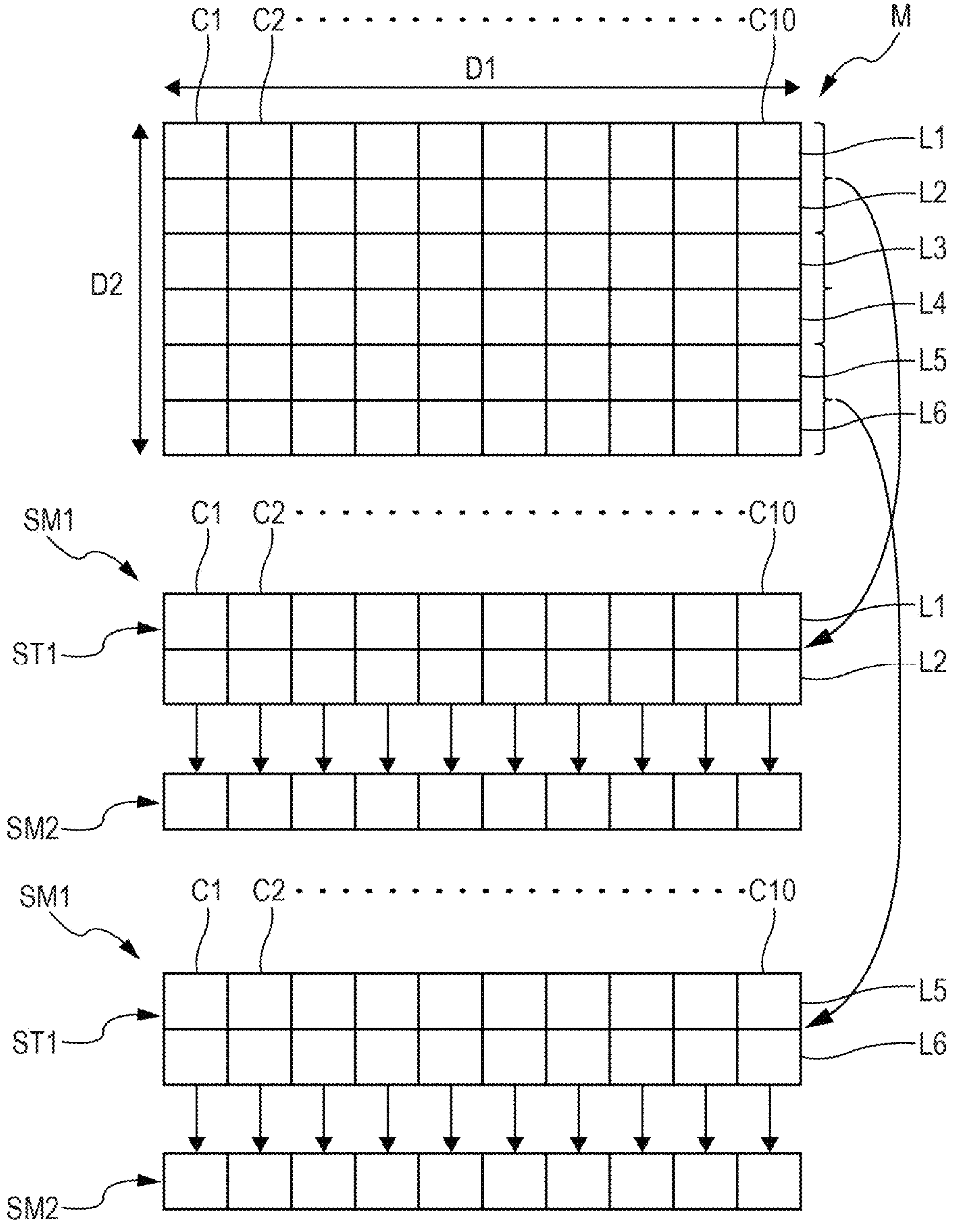
FIG. 10 schematically shows the steps of cutting the matrix of pixels of the image.

The example shown in FIG. 10 and FIG. 8 shows the cutting of the matrix M of pixels. In this example, the first dimension D1 of the matrix M of pixels corresponds to a number of columns C1, C2, . . . , C10 of pixels and the second dimension D2 of the matrix M of pixels corresponds to a number of rows L1, L2, L3, L4, L5, L6. In this example, each first sub-matrix SM1 has a number of columns C1, C2, . . . , C10 of pixels equal to the first dimension D1 of the matrix M of pixels and a number of rows L1, L2, L3, L4, L5, L6 of pixels that is equal to two. In the example shown in FIG. 10, each first sub-matrix SM1 has a number of columns of pixels equal to 10 columns of pixels and a number of rows of pixels equal to 2 rows of pixels.

Preferably, the number of rows L1, L2, L3, L4, L5, L6 of pixels of each sub-matrix is equal to four.

The first determination unit 12 is configured for determining a mean intensity curve C for at least one first strip ST1 selected from the first strips ST1 originating from the first cutting unit 11 cutting the matrix M of pixels.

A mean intensity curve C can be determined for all the first strips ST1. In this case, all the first strips ST1 originating from cutting the matrix M of pixels are selected.

In the description, the intensity corresponds to the light intensity. In addition, the "intensity of a pixel" refers to the light intensity captured and encoded by the pixel.

However, a mean intensity curve C can be determined for a combination of first strips ST1. In this case, only some first strips ST1 are selected. For example, they can be selected as a function of their position in the matrix M of pixels.

In the example shown in FIG. 10, a mean intensity curve C is determined for the first strips corresponding to a first sub-matrix SM1 formed by rows L1 and L2 and to a first sub-matrix SM1 formed by rows L5 and L6.

The mean intensity curve C is determined by computing, for each column C1, C2, . . . , C10 of pixels of the first sub-matrix SM1 of the one or more selected first strips ST1, a mean intensity of the one or more pixels of each column C1, C2, . . . , C10 of pixels.

Figure 11:
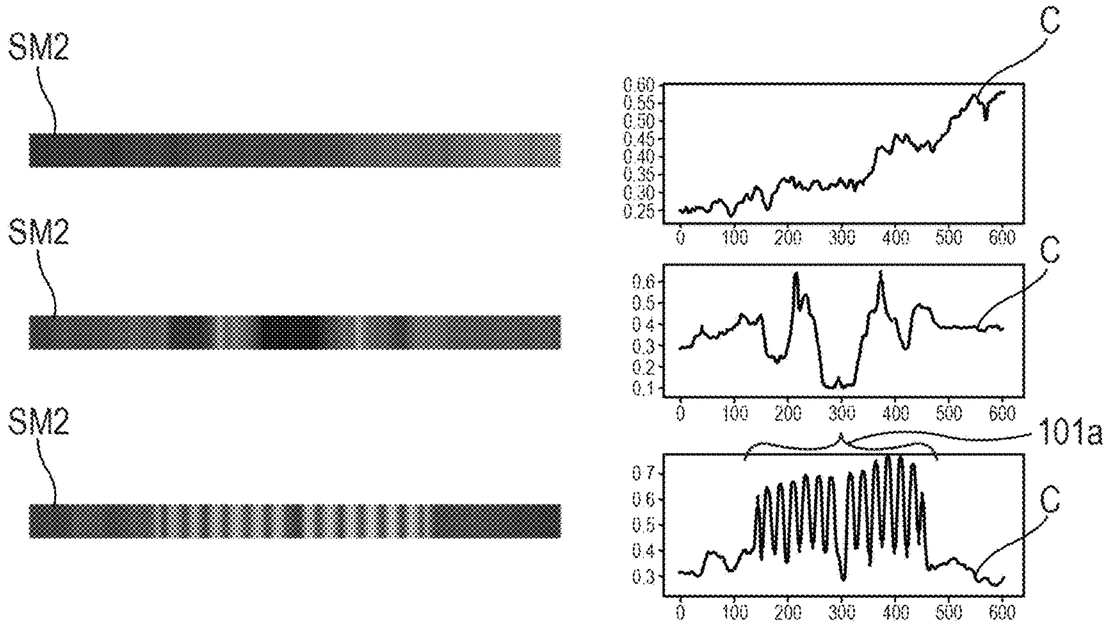
FIG. 11 schematically shows how mean intensity curves are determined based on the mean intensities of the pixels.

This computation can correspond to determining a matrix SM2 of pixels comprising a row of pixels. Each pixel in this row of pixels has an intensity that is equal to the mean of the intensities of the pixels in the column to which said pixel belongs. As shown in FIG. 11, the mean intensity curves C (on the right of FIG. 11) are then determined based on these matrices SM2 of pixels (on the left of FIG. 11). Each mean intensity curve C includes the position of the pixels in the matrix SM2 of pixels on the abscissa and the mean intensity of each of the pixels of the matrix SM2 of pixels on the ordinate.

The first recognition unit 13 is configured for recognizing, in the mean intensity curve C of the one or more first selected strips ST1, at least one curve shape characteristic of at least one ground marking element 100 of at least one landing runway T.

Figure 7:
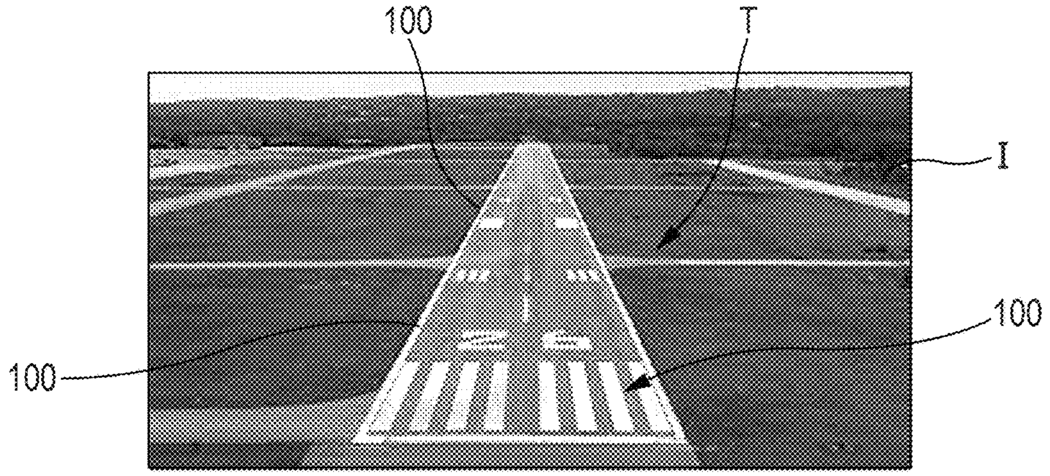
FIG. 7 shows an image captured by an image capture unit and collected by the image collection unit.

The ground marking element 100 can correspond to the "piano" located at the threshold of the landing runway T (FIG. 1, FIG. 7).

In FIG. 11, the matrix SM2 of pixels at the bottom of the figure has been determined based on a first sub-matrix SM1 whose strip ST1 includes a ground marking element 100 corresponding to a piano. The piano corresponds to a pattern horizontally repeated several times in the image I. The mean intensity curve C determined based on the matrix SM2 of pixels shown to the right of the matrix SM2 includes the information 101*a* concerning this repeated pattern. The mean intensity curve C therefore can include information characteristic of the ground marking element 100.

According to an embodiment, the detection system S can further comprise a second set of units U2 comprising, a second cutting unit 21, a second determination unit 22 and a second recognition unit 23.

The second cutting unit 21 is configured for cutting the matrix M of pixels into second parallel strips ST2 each associated with a respective position of each second strip ST2 in the matrix M of pixels of the one or more images I. Each second strip ST2 corresponds to a second sub-matrix having at least one row L1, L2 of pixels and a number of columns C1, C2, . . . , C10 of pixels equal to the second dimension D2 of the matrix M of pixels.

The second determination unit 22 is configured for determining a mean intensity curve C for at least one second strip ST2 selected from the second strips ST2 originating from cutting the matrix M of pixels by the second cutting unit 21. The mean intensity curve C is determined by computing, for each column C1, C2, . . . , C10 of pixels of the second sub-matrix of the one or more second selected strips ST2, a mean intensity of the one or more pixels of each column C1, C2, . . . , C10 of pixels. The mean intensity curve can be determined in the same way as for the first set of units U1.

As for the first set of units U1, a mean intensity curve C can be determined for all the second strips ST2. In this case, all the second strips ST2 originating from the matrix M of pixels are selected. However, a mean intensity curve C can be determined for a combination of second strips ST2. In this case, only certain second ST2 strips are selected. For example, they can be selected as a function of their position in the matrix M of pixels.

The second recognition unit 23 is configured for recognizing, in the mean intensity curve C of the one or more second selected strips ST2, a curve shape characteristic of at least one ground marking element 100 of at least one landing runway T.

By virtue of the second set of units U2 (with the first set of units U1), it is possible to detect the ground marking elements 100 extending along the first dimension D1 of the image I and the ground marking elements extending along the second dimension D2 of the image I.

In the case whereby the detection system comprises only the first set of units U1, the detection unit 2 of the detection system S is configured for detecting a position of the one or more ground marking elements 100 of at least one landing runway T in the one or more images I based on the one or more recognized ground marking elements 100 and on the position of the one or more first selected strips ST1 in the matrix M of pixels of the one or more images I.

In the case whereby the detection system comprises the first set of units U1 and the second set of units U2, the detection unit 2 of the detection system S is configured for detecting a position of the one or more ground marking elements 100 of at least one landing runway T in the one or more images I based on the one or more recognized ground marking elements 100, on the position of the one or more first selected strips ST1 in the matrix M of pixels of the one or more images I and on the position of the one or more second selected strips ST2 in the matrix M of pixels of the one or more images I.

The detection system S can also comprise a third determination unit (DET3) 6 configured for determining a position of at least one threshold of the one or more landing runways T based on the position of the one or more ground marking elements 100 detected in the one or more images I and on characteristics of the one or more landing runways T originating from a runway database (DB1) 41.

The runway database 41 can correspond to an ICAO (International Civil Aviation Organization) database in ICAO Annex 14.

The detection system S can also comprise a fourth determination unit (DET4) 7 configured for determining a position of the aircraft AC based on the position of the one or more thresholds of the one or more landing runways T in the image I, on a position and angles of the one or more image collection units 10 and on characteristics of the one or more landing runways T originating from the runway database 41.

When the aircraft AC is in flight with a view to landing on a landing runway T, the fourth determination unit 7 determines the lateral position and the vertical position of the aircraft AC. When the aircraft AC is taxiing, the fourth determination unit 7 determines the lateral position of the aircraft AC.

The detection system S can also comprise a transmission unit 8. The transmission unit (TRANS) 8 can be configured to send a user device 9 a signal representing:

- the position of at least one threshold of the one or more landing runways T (determined by the third determination unit 6); or
- the position of the aircraft AC (determined by the fourth determination unit 7); or
- the position of the one or more ground marking elements 100 of at least one landing runway T in the one or more images I (determined by the detection unit 2).

The user device 9 can correspond to a display device. By virtue of the detected position of the one or more ground marking elements 100 of at least one landing runway T in the one or more images I, the display device can superimpose the image I of the landing runway T and graphic elements that highlight the ground marking elements 100 of the landing runway T.

The user device 9 can also correspond to a flight control system of the aircraft AC. Knowledge of the position of the threshold of the landing runway T in the image I, knowledge of the position and angles of the image collection unit 10 and knowledge of the characteristics of the landing runway T, such as its width, can be used to determine the vertical position and the lateral position of the aircraft AC. The characteristics of the landing runway T can include the geographical coordinates (latitude, longitude, altitude) of the considered ground marking, for example, the angular orientation of the runway in terms of width, length, etc. These characteristics of the runway T can originate from the database 41.

According to a first configuration, the first recognition unit 13 can be configured for recognizing a curve shape characteristic of at least one ground marking element 100 of the one or more landing runways T in the mean intensity curve C of the one or more first selected strips ST1 using a neural network.

According to the embodiment in the first configuration, the second recognition unit 23 is further configured for recognizing a curve shape characteristic of at least one ground marking element 100 of the one or more landing runways T in the mean intensity curve C of the one or more second selected strips ST2 using a neural network.

Figure 2:
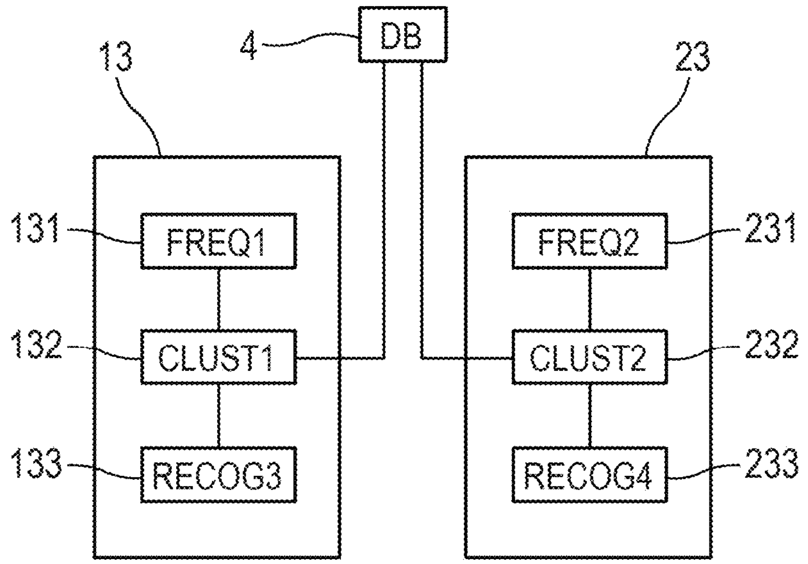
FIG. 2 schematically shows the first and second recognition units according to the second configuration.

According to a second configuration (FIG. 2), the first recognition unit 13 can also comprise a first frequency analysis sub-unit 131 (FREQ), a first data partitioning sub-unit (or "clustering unit") 132 (CLUST) and a first recognition sub-unit 133.

The first frequency analysis sub-unit 131 is configured for detecting at least one harmonic in the mean intensity curve C of the one or more first selected strips ST1.

The first data partitioning sub-unit 132 is configured for forming at least one group comprising one or more harmonics characteristic of a ground marking element 100 of the one or more landing runways T. The one or more harmonics characteristic of a ground marking element 100 is/are stored in a database 4 (DB2).

The recognition sub-unit 133 is configured for recognizing at least one ground marking element 100 of the one or more landing runways T for the one or more groups formed by the first data partitioning sub-unit 132.

According to the embodiment in the second configuration (FIG. 2), the second recognition unit 23 can further comprise a second frequency analysis sub-unit 231, a second data partitioning sub-unit 232 and a second recognition sub-unit 233.

The second frequency analysis sub-unit 231 is configured for detecting at least one harmonic in the mean intensity curve C of the one or more second selected strips ST2.

The second data partitioning sub-unit 232 is configured for forming at least one group comprising one or more harmonics characteristic of a ground marking element 100 of the one or more landing runways T. The one or more harmonics characteristic of a ground marking element 100 are also stored in a database 4.

The second recognition sub-unit 233 is configured for recognizing at least one ground marking element 100 of the one or more landing runways T for the one or more groups formed by the second data partitioning sub-unit 232.

Figure 3:
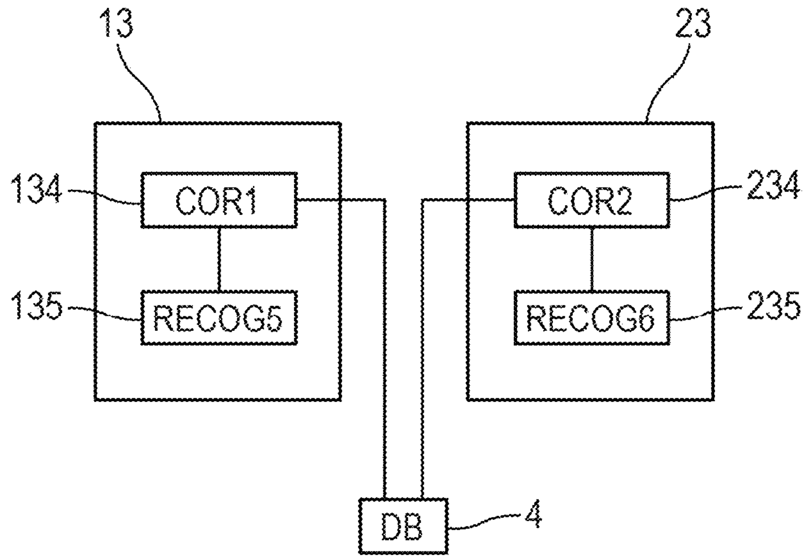
FIG. 3 schematically shows the first and second recognition units according to the third configuration.

According to a third configuration (FIG. 3), the first recognition unit 13 comprises a first correlation sub-unit 134 (COR) and a first recognition sub-unit 135.

Figure 12:
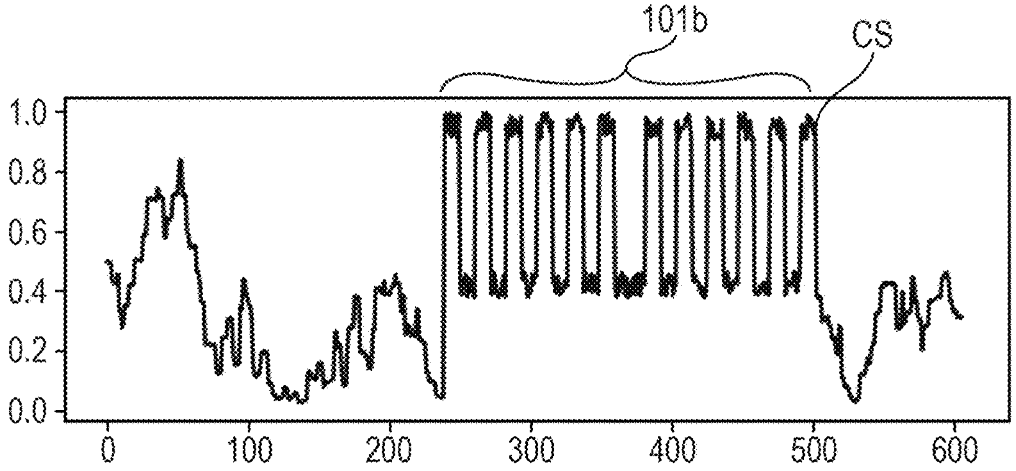
FIG. 12 shows a synthetic curve characteristic of a ground marking element, in particular of a piano.

The first correlation sub-unit 134 is configured for determining at least one correlation parameter between the mean intensity curve C of the one or more first selected strips ST1 and at least one synthetic curve CS characteristic of a ground marking element 100. The one or more synthetic curves CS is/are stored in a database 4. FIG. 12 shows an example of a synthetic curve CS.

The first recognition sub-unit 135 is configured for recognizing at least one ground marking element 100 of the one or more landing runways T if the correlation parameter determined by the first correlation sub-unit 134 is greater than or equal to a predetermined value.

According to the embodiment in the third configuration (FIG. 3), the second recognition unit 23 can further comprise a second correlation sub-unit 234, as well as a second recognition sub-unit 235.

The second correlation sub-unit 234 is configured for determining at least one correlation parameter between the mean intensity curve C of the one or more second selected strips ST2 with at least one synthetic curve CS characteristic of a ground marking element 100. The one or more synthetic curves CS is/are stored in the database 4. The database 4 can comprise a plurality of synthetic curves CS. Each of the synthetic curves CS can comprise information characteristic of a ground marking element 100. For example, a synthetic curve CS can comprise information characteristic of the marking element 100 of the piano.

The second recognition sub-unit 235 is configured for recognizing at least one ground marking element 100 of the one or more landing runways T if the correlation parameter determined by the second correlation sub-unit 234 is greater than or equal to a predetermined value.

The synthetic curve CS shown in FIG. 12 includes information 101*b* characteristic of the ground marking element 100 of the piano. The mean intensity curve C shown at the bottom right of FIG. 11 also includes information 101*a* characteristic of the ground marking element 100 of the piano. Thus, implementing the first correlation sub-unit 134 allows a correlation parameter to be determined that is greater than or equal to the predetermined value. The piano is therefore recognized by the recognition sub-unit 235.

In addition, the first set of units U1 can comprise a first comparison unit 14 (COMP) and a first rectification unit 15 (RECT).

Any other ground marking element 100 can be recognized in the same way by the recognition sub-unit 235.

The first comparison unit 14 is configured for comparing the mean intensity curves C for which the same ground marking element 100 has been recognized in order to determine whether or not there is a shift between said mean intensity curves C.

The first rectification unit 15 is implemented if a shift has been determined. It is configured for rectifying the matrix M of pixels of the one or more images I as a function of the determined shift.

The first set of units U1 is then also implemented with the matrix M of pixels of the one or more images I rectified by the first rectification sub-unit 15.

According to the embodiment, the second set of units U2 also comprises a second comparison unit 24 and a second rectification unit 25.

The second comparison unit 24 is configured for comparing the mean intensity curves C for which the same ground marking element 100 has been recognized in order to determine whether or not there is a shift between said mean intensity curves C.

The second rectification unit 25 is implemented if a shift has been determined. It is configured for rectifying the matrix M of pixels of the one or more images I as a function of the determined shift.

The second set of units U2 is then also implemented with the matrix M of pixels of the one or more images I rectified by the second rectification sub-unit 25.

Figure 4:
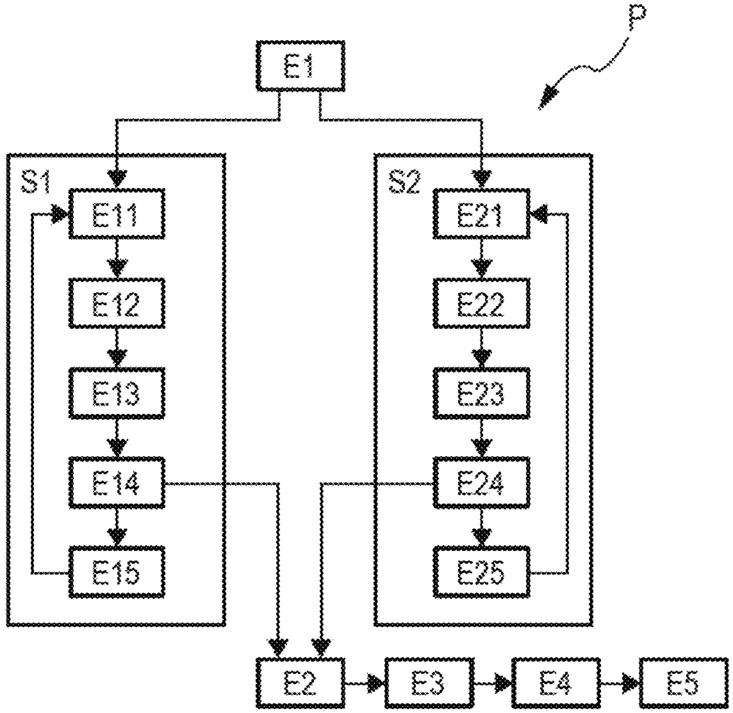
FIG. 4 schematically shows the detection method according to one embodiment.

The invention may also relate to a method P for detecting at least one ground marking element of at least one landing runway (FIG. 4).

The detection method P comprises at least the following steps:

an image collection step E1, implemented by an image collection unit 10, for collecting at least one image I captured by at least one image capture unit 1, the one or more images I being in the form of a matrix M of pixels having a first dimension D1 and a second dimension D2;

a first set of steps S1 comprising:

(a) a first cutting step E11, implemented by the first cutting unit 11, for cutting the matrix M of pixels into first parallel strips ST1 each associated with a respective position of each first strip ST1 in the matrix M of pixels of the one or more images I, each first strip ST1 corresponding to a first sub-matrix SM1 having at least one row L1, L2 of pixels and a number of columns C1, C2, . . . , C10 of pixels equal to the first dimension D1 of the matrix M of pixels;

(b) a first determination step E12, implemented by the first determination unit 12, for determining a mean intensity curve C for at least one first strip ST1 selected from the first strips ST1 originating from cutting the matrix M of pixels, the mean intensity curve C being determined by computing, for each column C1, C2, . . . C10 of pixels of the first sub-matrix SM1 of the one or more first selected strips ST1, a mean intensity of the one or more pixels of each column C1, C2, . . . , C10 of pixels; and (c) a first recognition step E13, implemented by the first recognition unit 13, for recognizing, in the mean intensity curve C of the one or more first selected strips ST1, a curve shape characteristic of at least one ground marking element 100 of at least one landing runway T.

The detection method further comprises:

a detection step E2, implemented by the detection unit 2, for detecting a position of the one or more ground marking elements 100 of at least one landing runway T in the one or more images I based on the one or more recognized ground marking elements 100 and on the position of the one or more first selected strips ST1 in the matrix M of pixels of the one or more images.

According to an embodiment, the detection method P further comprises a second set of steps S2 preceding the detection step E2.

The second set of steps S2 comprises:

a second cutting step E21, implemented by the second cutting unit 21, for cutting the matrix M of pixels into second parallel strips ST2 each associated with a respective position of each second strip ST2 in the matrix M of pixels of the one or more images I, each second strip ST2 corresponding to a second sub-matrix having at least one row L1, L2 of pixels and a number of columns C1, C2, . . . , C10 of pixels equal to the second dimension D2 of the matrix M of pixels;

a second determination step E22, implemented by the second determination unit 22, for determining a mean intensity curve C for at least one second strip ST2 selected from the second strips ST2 originating from cutting the matrix M of pixels, the mean intensity curve C being determined by computing, for each column C1, C2, . . . C10 of pixels of the second sub-matrix of the one or more second selected strips ST1, a mean intensity of the one or more pixels of each column C1, C2, . . . , C10 of pixels;

a second recognition step E23, implemented by the second recognition unit 23, for recognizing, in the mean intensity curve C of the one or more second selected strips ST2, a curve shape characteristic of at least one ground marking element 100 of at least one landing runway T.

In the preferred embodiment, the detection step E2 is implemented for detecting a position of the one or more ground marking elements 100 of at least one landing runway T in the one or more images I based on the one or more recognized ground marking elements 100, on the position of the one or more first selected strips ST1 in the matrix M of pixels of the one or more images I and on the position of the one or more second selected strips ST2 in the matrix M of pixels of the one or more images I.

According to a first alternative embodiment, the first recognition step E13 and/or the second recognition step E23 are implemented in order to recognize a curve shape characteristic of at least one ground marking element 100 of the one or more landing runways T in the mean intensity curve C of the one or more first selected strips ST1 and/or of the one or more second selected strips ST2 using a neural network.

The mean intensity curves C also can be used to train the neural network.

Figure 5:
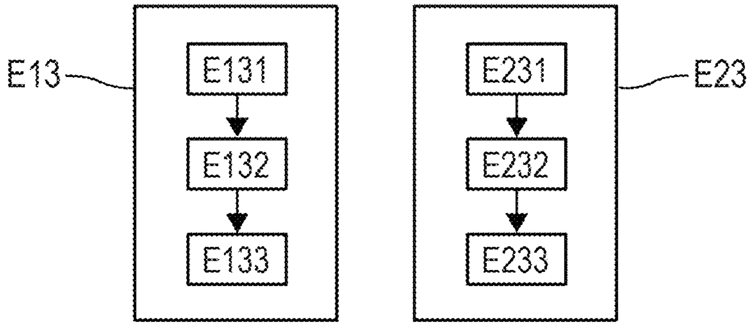
FIG. 5 schematically shows the first and second recognition steps according to the second configuration.

According to a second alternative embodiment (FIG. 5), the first recognition step E13 comprises the following sub-steps:

a first frequency analysis sub-step E131, implemented by the first frequency analysis sub-unit 131, for detecting at least one harmonic in the mean intensity curve C of the one or more first selected strips ST1;

a first data partitioning sub-step E132, implemented by the first data partitioning sub-unit 132, for forming at least one group comprising one or more harmonics characteristic of a ground marking element 100 of the landing runway T, with the one or more harmonics characteristic of a ground marking element 100 being stored in a database 4;

a first recognition sub-step E133, implemented by a first recognition sub-unit 133, for recognizing at least one ground marking element 100 of the one or more landing runways T for the one or more groups formed in the first data partitioning sub-step E132.

According to an embodiment for the second alternative embodiment (FIG. 5), the second recognition step E23 comprises the following sub-steps:

a second frequency analysis sub-step E231, implemented by the second frequency analysis sub-unit 231, for detecting at least one harmonic in the mean intensity curve C of the one or more second selected strips ST2;

a second data partitioning sub-step E232, implemented by the second data partitioning sub-unit 232, for forming at least one group comprising one or more harmonics characteristic of a ground marking element 100 of the landing runway T, with the one or more harmonics characteristic of a ground marking element 100 being stored in a database 4;

a second recognition sub-step E233, implemented by the second recognition sub-unit 233, for recognizing at least one ground marking element 100 of the one or more landing runways T for the one or more groups formed in the second data partitioning sub-step E232.

Figure 6:
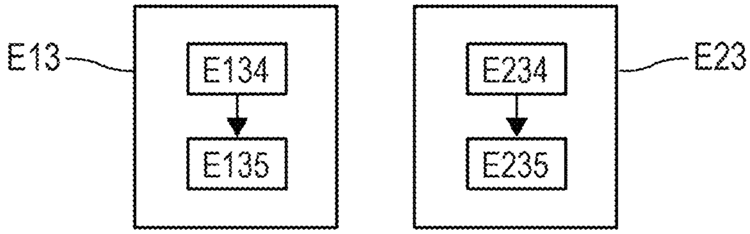
FIG. 6 schematically shows the first and second recognition steps according to the third configuration.

According to a third alternative embodiment (FIG. 6), the first recognition step E13 comprises the following sub-steps:

a first correlation sub-step E134, implemented by the first correlation sub-unit 134, for determining at least one correlation parameter between the mean intensity curve C of the one or more first selected strips ST1 with at least one synthetic curve CS characteristic of a ground marking element 100, with the one or more synthetic curves CS being stored in a database 4;

a first recognition sub-step E135, implemented by the first recognition sub-unit 135, for recognizing at least one ground marking element 100 of the one or more landing runways T if the correlation parameter determined in the first correlation sub-step E134 is greater than or equal to a predetermined value.

According to an embodiment for the third alternative embodiment (FIG. 6), the second recognition step E23 comprises the following sub-steps:

a second correlation sub-step E234, implemented by the second correlation sub-unit 234, for determining at least one correlation parameter between the mean intensity curve C of the one or more second selected strips ST2 with at least one synthetic curve CS characteristic of a ground marking element 100, with the one or more synthetic curves CS being stored in a database 4;

a second recognition sub-step E235, implemented by the second recognition sub-unit 235, for recognizing at least one ground marking element 100 of the one or more landing runways T if the correlation parameter determined in the second correlation sub-step E234 is greater than or equal to a predetermined value.

In addition, the first set of steps S1 can comprise:

a first comparison step E14, implemented by the first comparison unit 14, for comparing the mean intensity curves C for which the same ground marking element 100 has been recognized in order to determine whether or not there is a shift between said mean intensity curves C;

a first rectification step E15, implemented by the first rectification unit 15 if a shift has been determined, for rectifying the matrix M of pixels of the one or more images I as a function of the determined shift.

The first set of steps S1 then can be repeated with the matrix M of pixels of the one or more images I rectified in the first rectification step E14.

According to an embodiment, the second set of steps S2 can comprise:

a second comparison step E24, implemented by the second comparison unit 24, for comparing the mean intensity curves C for which the same ground marking element 100 has been recognized in order to determine whether or not there is a shift between said mean intensity curves C;

a second rectification step E25, implemented by the second rectification unit 25 if a shift has been determined, for rectifying the matrix M of pixels of the one or more images I as a function of the determined shift.

The second set of steps S2 then can be repeated with the matrix M of pixels of the one or more images I rectified in the second rectification step E24.

The detection method P can also comprise a third determination step E3, implemented by the third determination unit 6, for determining a position of at least one threshold of the one or more landing runways T based on the position of the one or more ground marking elements 100 detected in the one or more images I and on characteristics of the one or more landing runways T originating from a runway database 41.

The detection method P can also comprise a fourth determination step E4, implemented by the fourth determination unit 7, for determining a position of the aircraft AC based on the position of the one or more thresholds of the one or more landing runways T in the image I, on a position and angles of the one or more image collection units 10 and on characteristics of the one or more landing runways T originating from the runway database 41.

The detection method P can also comprise a transmission step E5, implemented by the transmission unit 8, for sending a user device 9 a signal representing the position of at least one threshold of the one or more landing runways T or the position of the aircraft AC, or the position of the one or more ground marking elements 100 of at least one landing runway T in the one or more images I.

The detection system S and the detection method P have many advantages, in particular:

- for testing or training purposes in the case of a deep learning model, data management is facilitated. Indeed, one-dimensional signals (mean intensity curves C) are significantly lighter than two-dimensional signals (images I). This provides an advantage for transferring data, storing data and processing data;
- processing one-dimensional signals is also faster than processing two-dimensional signals. This allows the computing capacities of the computing equipment on board an aircraft AC to be reduced and consequently reduces their cost and power consumption;
- in terms of the data that can be used for testing or training neural networks, generating one-dimensional synthetic signals (curves) is easier to implement and is less expensive than generating two-dimensional images of a landing runway, which requires the use of expensive tools and simulators;
- another advantage in the aeronautical context is the explicability-related aspect. An algorithm based on deep learning will be a black box in terms of explaining the results output from the neural network. The proposed method makes it much easier to understand why a particular result has been observed. This is because the signal processing techniques have already been widely certified in the aeronautical field.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detecting at least one ground marking element of at least one landing runway, the method comprising:

- an image collection step, implemented by an image collection unit, for collecting at least one image captured by at least one image capture unit, the one or more images being in the form of a matrix of pixels having a first dimension and a second dimension;
- a first set of steps comprising:
  - a first cutting step, implemented by a first cutting unit, for cutting the matrix of pixels into first parallel strips each associated with a respective position of each first strip in the matrix of pixels of the one or more images, each first strip corresponding to a first sub-matrix having at least one row of pixels and a number of columns of pixels equal to the first dimension of the matrix of pixels;
  - a first determination step, implemented by a first determination unit, for determining a mean intensity curve for at least one first strip selected from the first strips originating from cutting the matrix of pixels, the mean intensity curve being determined by computing, for each column of pixels of the first sub-matrix of the one or more first selected strips, a mean intensity of the one or more pixels of each column of pixels; and
  - a first recognition step, implemented by a first recognition unit, for recognizing, in the mean intensity curve of the one or more first selected strips, a curve shape characteristic of at least one ground marking element of at least one landing runway; and
- a detection step, implemented by a detection unit, for detecting a position of the one or more ground marking elements of at least one landing runway in the one or more images based on the one or more recognized ground marking elements and on the position of the one or more first selected strips in the matrix of pixels of the one or more images.

2. The method as claimed in claim 1, further comprising a second set of steps preceding the detection step, the second set of steps comprising:

- a second cutting step, implemented by a second cutting unit, for cutting the matrix of pixels into second parallel strips each associated with a respective position of each second strip in the matrix of pixels of the one or more images, each second strip corresponding to a second sub-matrix having at least one row of pixels and a number of columns of pixels equal to the second dimension of the matrix of pixels;
- a second determination step, implemented by a second determination unit, for determining a mean intensity curve for at least one second strip selected from the second strips originating from cutting the matrix of pixels, the mean intensity curve being determined by computing, for each column of pixels of the second sub-matrix of the one or more second selected strips, a mean intensity of the one or more pixels of each column of pixels; and
- a second recognition step, implemented by a second recognition unit, for recognizing, in the mean intensity curve of the one or more second selected strips, a curve shape characteristic of at least one ground marking element of at least one landing runway;
- wherein the detection step being implemented for detecting a position of the one or more ground marking elements of at least one landing runway in the one or more images based on the one or more recognized ground marking elements, on the position of the one or more first selected strips in the matrix of pixels of the one or more images and on the position of the one or more second selected strips in the matrix of pixels of the one or more images.

3. The method as claimed in claim 1, wherein the first recognition step and/or the second recognition step are implemented to recognize a curve shape characteristic of at least one ground marking element of the one or more landing runways in the mean intensity curve of the one or more first selected strips and/or of the one or more second selected strips using a neural network.

4. The method as claimed in claim 1, wherein the first recognition step comprises:

- a first frequency analysis sub-step, implemented by a first frequency analysis sub-unit, for detecting at least one harmonic in the mean intensity curve of the one or more first selected strips;
- a first data partitioning sub-step, implemented by a first data partitioning sub-unit, for forming at least one group comprising one or more harmonics characteristic of a ground marking element of the landing runway, with the one or more harmonics characteristic of a ground marking element being stored in a database; and a first recognition sub-step, implemented by a first recognition sub-unit, for recognizing at least one ground marking element of the one or more landing runways for the one or more groups formed in the first data partitioning sub-step.

5. The method as claimed in claim 4, wherein the second recognition step comprises:

a second frequency analysis sub-step, implemented by a second frequency analysis sub-unit, for detecting at least one harmonic in the mean intensity curve of the one or more second selected strips;

a second data partitioning sub-step, implemented by a second data partitioning sub-unit, for forming at least one group comprising one or more harmonics characteristic of a ground marking element of the landing runway, with the one or more harmonics characteristic of a ground marking element being stored in a database; and a second recognition sub-step, implemented by a second recognition sub-unit, for recognizing at least one ground marking element of the one or more landing runways for the one or more groups formed in the second data partitioning sub-step.

6. The method as claimed in claim 1, wherein the first recognition step comprises: the following sub-steps:

a first correlation sub-step, implemented by a first correlation sub-unit, for determining at least one correlation parameter between the mean intensity curve of the one or more first selected strips with at least one synthetic curve characteristic of a ground marking element, with the one or more synthetic curves being stored in a database; and a first recognition sub-step, implemented by a first recognition sub-unit, for recognizing at least one ground marking element of the one or more landing runways if the correlation parameter determined in the first correlation sub-step is greater than or equal to a predetermined value.

7. The method as claimed in claim 6, wherein the second recognition step comprises:

a second correlation sub-step, implemented by a second correlation sub-unit, for determining at least one correlation parameter between the mean intensity curve of the one or more second selected strips with at least one synthetic curve characteristic of a ground marking element, with the one or more synthetic curves being stored in a database; and a second recognition sub-step, implemented by a second recognition sub-unit, for recognizing at least one ground marking element of the one or more landing runways if the correlation parameter determined in the second correlation sub-step is greater than or equal to a predetermined value.

8. The method as claimed in claim 1, wherein the first set of steps comprises:

a first comparison step, implemented by a first comparison unit, for comparing the mean intensity curves for which the same ground marking element has been recognized in order to determine whether or not there is a shift between said mean intensity curves; and a first rectification step, implemented by a first rectification unit if a shift has been determined, for rectifying the matrix of pixels of the one or more images as a function of the determined shift;

wherein the first set of steps being repeated with the matrix of pixels of the one or more images rectified in the first rectification step.

9. The method as claimed in claim 8, wherein the second set of steps comprises:

a second comparison step, implemented by a second comparison unit, for comparing the mean intensity curves for which the same ground marking element has been recognized in order to determine whether or not there is a shift between said mean intensity curves; and a second rectification step, implemented by a second rectification unit if a shift has been determined, for rectifying the matrix of pixels of the one or more images as a function of the determined shift;

wherein the second set of steps being repeated with the matrix of pixels of the one or more images rectified in the second rectification step.

10. The method as claimed in claim 1, further comprising:

a third determination step, implemented by a third determination unit, for determining a position of at least one threshold of the one or more landing runways based on the position of the one or more ground marking elements detected in the one or more images and on characteristics of the one or more landing runways originating from a runway database.

11. The method as claimed in claim 1, further comprising:

a fourth determination step, implemented by a fourth determination unit, for determining a position of the aircraft based on the position of the one or more thresholds of the one or more landing runways in the image, on a position and angles of the one or more image collection units and on characteristics of the one or more landing runways originating from the runway database.

12. The method as claimed in claim 1, further comprising:

a transmission step, implemented by a transmission unit, for sending a user device a signal representing the position of at least one threshold of the one or more landing runways or the position of the aircraft, or the position of the one or more ground marking elements of at least one landing runway in the one or more images.

13. A system for detecting at least one ground marking element of at least one landing runway, the system comprises:

an image collection unit configured for collecting at least one image captured by at least one image capture unit, the one or more images being in the form of a matrix of pixels having a first dimension and a second dimension;

a first set of units comprising:

a first cutting unit configured for cutting the matrix of pixels into first parallel strips each associated with a respective position of each first strip in the matrix of pixels of the one or more images, each first strip corresponding to a first sub-matrix having at least one row of pixels and a number of columns of pixels equal to the first dimension of the matrix of pixels;

a first determination unit configured for determining a mean intensity curve for at least one first strip selected from the first strips originating from cutting the matrix of pixels, the mean intensity curve being determined by computing, for each column of pixels of the first sub-matrix of the one or more first selected strips, a mean intensity of the one or more pixels of each column of pixels; and a first recognition unit configured for recognizing, in the mean intensity curve of the one or more first selected strips, a curve shape characteristic of at least one ground marking element of at least one landing runway; and a detection unit configured for detecting a position of the one or more ground marking elements in the one or more images based on the one or more recognized ground marking elements and on the position of the one or more first selected strips in the matrix of pixels of the one or more images.

14. The system as claimed in claim 13, further comprising:

a second cutting unit configured for cutting the matrix of pixels into second parallel strips each associated with a respective position of each second strip in the matrix of pixels of the one or more images, each second strip corresponding to a second sub-matrix having at least one row of pixels and a number of columns of pixels equal to the second dimension of the matrix of pixels; and a second determination unit configured for determining a mean intensity curve for at least one second strip selected from the second strips originating from cutting the matrix of pixels, the mean intensity curve being determined by computing, for each column of pixels of the second sub-matrix of the one or more second selected strips, a mean intensity of the one or more pixels of each column of pixels; and a second recognition unit configured for recognizing, in the mean intensity curve of the one or more second selected strips, a curve shape characteristic of at least one ground marking element of at least one landing runway;

wherein the detection unit is configured for detecting a position of the one or more ground marking elements of at least one landing runway in the one or more images based on the one or more recognized ground marking elements, on the position of the one or more first selected strips in the matrix of pixels of the one or more images and on the position of the one or more second selected strips in the matrix of pixels of the one or more images.

15. An aircraft comprising the detection system recited in claim 13.

16. A method performed automatically by an aircraft in flight and while approaching a runway, the method comprising:

capturing an image of the runway, wherein the image includes a matrix of pixels having a first dimension and a second dimension;

dividing the matrix of pixels into parallel strips and each of the parallel strips include a first sub-matrix of the matrix of pixels and the first sub-matric includes a row of the pixels and a number of columns of pixels equal to the first dimension of the matrix of pixels;

determining a mean intensity curve for at least one of the parallel strips by calculating for each of the columns of the first sub-matrix a mean intensity of the pixels in the column;

recognizing in the mean intensity curve a curve shape characteristic of a ground marking element of the runway; and detecting a position of the ground marking element based on the recognized ground marking element and on a position of the parallel strip corresponding to the recognized ground marking element.

* * * * *